US008860585B2

(12) United States Patent
Tsuzuki

(10) Patent No.: US 8,860,585 B2
(45) Date of Patent: Oct. 14, 2014

(54) VEHICLE APPROACH WARNING APPARATUS

(71) Applicant: Anden Co., Ltd., Anjo (JP)

(72) Inventor: Haruyuki Tsuzuki, Toyota (JP)

(73) Assignee: Anden Co., Ltd., Anjo (JP)

(*) Notice: Subject to any disclaimer, the term of this patent is extended or adjusted under 35 U.S.C. 154(b) by 0 days.

(21) Appl. No.: 13/871,032

(22) Filed: Apr. 26, 2013

(65) Prior Publication Data

US 2013/0314251 A1 Nov. 28, 2013

(30) Foreign Application Priority Data

May 24, 2012 (JP) ................................. 2012-118784

(51) Int. Cl.
*G08G 1/00* (2006.01)
*G08G 1/16* (2006.01)
*G06F 11/07* (2006.01)
*B60Q 5/00* (2006.01)

(52) U.S. Cl.
CPC ............ *G08G 1/166* (2013.01); *G06F 11/0796* (2013.01); *B60Q 5/008* (2013.01)
USPC ........... 340/901; 340/944; 340/466; 340/435; 340/425.5

(58) Field of Classification Search
USPC ............... 340/901, 944, 435–438, 466, 425.5
See application file for complete search history.

(56) References Cited

U.S. PATENT DOCUMENTS

| 7,650,001 B2 * | 1/2010 | Yasushi et al. ................... 381/61 |
| 8,169,305 B2 * | 5/2012 | Matsumoto et al. ....... 340/384.1 |
| 8,299,904 B2 * | 10/2012 | Konet et al. ................ 340/384.1 |
| 8,593,300 B2 * | 11/2013 | Ooshima et al. .............. 340/901 |
| 8,669,858 B2 * | 3/2014 | Yoshino et al. ............... 340/466 |
| 8,710,974 B2 * | 4/2014 | Iwamoto ....................... 340/463 |
| 2013/0038435 A1 * | 2/2013 | Muroya ..................... 340/425.5 |
| 2013/0257605 A1 | 10/2013 | Tsuzuki et al. |

FOREIGN PATENT DOCUMENTS

| JP | 2004-136831 A | 5/2004 |
| JP | 2012-121518 A | 6/2012 |
| JP | 2013-028232 A | 2/2013 |

* cited by examiner

*Primary Examiner* — Eric M Blount
(74) *Attorney, Agent, or Firm* — Posz Law Group, PLC

(57) ABSTRACT

A vehicle approach warning apparatus has a failure determining section and a monitor voltage output circuit connected to a potential change terminal. During a sound emit period where a warning signal is being outputted to an sound emitter for emitting a warning sound, the output circuit outputs a monitor voltage from an output terminal by half-wave rectifying and integrating the warning signal upon a change of a potential of the potential change terminal to a high level. When a short-circuit failure occurs in the sound emitter, the output circuit keeps a potential of the output terminal to a low level during the sound emit period. During the sound emit period, the failure determining section sets the potential of the potential change terminal to a high level and determines whether the short-circuit failure occurs based on the monitor voltage.

10 Claims, 3 Drawing Sheets

VEHICLE APPROACH WARNING APPARATUS

CROSS REFERENCE TO RELATED APPLICATION

This application is based on Japanese Patent Application No. 2012-118784 filed on May 24, 2012, the disclosure of which is incorporated herein by reference.

FIELD

The present disclosure relates to a vehicle approach warning apparatus for warning of an approach of a vehicle by emitting a warning sound from a sound emitter mounted on the vehicle in response to a warning signal.

BACKGROUND

An electric vehicle (EV) and a hybrid vehicle (HV) are silent because of its structure, and therefore it is difficult for pedestrians to be aware of the approach of such a silent vehicle. In recent years, there has been an increased number of electric or hybrid vehicles equipped with a vehicle approach warning apparatus. As disclosed in, for example, JP-A-2004-136831, the vehicle approach warning apparatus generates warning sound, such as pseudo engine sound or pseudo motor sound, to warn pedestrians of the approach of the vehicle.

In the vehicle approach warning apparatus, when a failure occurs in a speaker so that the speaker cannot emit the warning sound, the vehicle approach warning apparatus loses the function to warn pedestrians of the approach of the vehicle. In this case, if a driver continues to drive the vehicle without being aware of the failure in the speaker, the vehicle approach warning apparatus is more of a danger than a protection for pedestrians. A reason for this is that although the driver drives the vehicle on the assumption that the warning sound is emitted to the pedestrian, no warning sound is emitted in reality. Therefore, it is important to detect a failure in the vehicle approach warning apparatus.

SUMMARY

The present inventor devises a method to detect a failure in such a vehicle approach warning apparatus. In this method, a resistor (hereinafter referred to as the "detection resistor") is inserted in a current path of a speaker to convert a speaker current to a voltage. Then, the voltage across the detection resistor is monitored, and a failure in the speaker is detected based on the monitored voltage. For example, when an open-circuit failure occurs in the speaker, the speaker current does not flow through an output wire of the speaker so that the voltage across the detection resistor can be zero volts. Therefore, the open-circuit failure can be detected by comparing the voltage across the resistor with a predetermined open-circuit determination threshold value. In contrast, when a short-circuit failure occurs in the speaker, an excessive direct current flows through the output wire of the speaker so that the voltage across the detection resistor can become large. Therefore, the short-circuit failure can be detected by comparing the voltage across the resistor with a predetermined short-circuit determination threshold value.

However, since the speaker current decreases with an increase in a resistance of the detection resistor, output sound pressure of the speaker decreases with the increase in the resistance of the detection resistor. Therefore, the resistance of the detection resistor needs to be small.

However, since the monitored voltage decreases with a decrease in the resistance of the detection resistor, a gain (i.e., amplification factor) of an amplifier to amplify the monitored voltage needs to be large. For example, when the resistance of the detection resistor is one ohm ($1\Omega$), the amplifier needs to have a large gain of several tens of times.

However, when external noise, which can occur inside and outside of the vehicle, is superimposed on the output wire of the speaker, not only the speaker current but also the noise is amplified by the larger gain. As a result, accuracy of detecting the failure in the speaker may be reduced. In particular, in a vehicle, the external noise is likely to be superimposed on the output wire of the speaker due to a relatively long length of the output wire (e.g., a few meters long).

In view of the above, it is an object of the present disclosure to improve accuracy of detecting a failure in a speaker.

According to an aspect of the present disclosure, a vehicle approach warning apparatus is used to warn of an approach of a vehicle by causing a sound emitter mounted on the vehicle to emit a warning sound in response to a warning signal. The vehicle approach warning apparatus includes a warning sound generator, a monitor voltage output circuit, a sound emit determining section, and a short-circuit failure determining section. The warning sound generator generates the warning signal and outputs the warning signal to the sound emitter through first and second connection terminals connected to the sound emitter. The monitor voltage output circuit is connected to a potential change terminal having a potential changeable between a high level and a first low level. The monitor voltage output circuit outputs a monitor voltage from an output terminal. The sound emit determining section determines whether it is in the middle of a sound emit period where the warning signal is being outputted to the sound emitter or in the middle of a non-sound emit period where the warning signal is not being emitted to the sound emitter. The short-circuit failure determining section determines whether the sound emitter suffers from a short-circuit failure based on the monitor voltage. The short-circuit failure determining section changes the potential of the potential change terminal to the high level during the sound emit period. During the sound emit period, the monitor voltage output circuit outputs the monitor voltage from the output terminal by half-wave rectifying and integrating the warning signal upon a change of the potential of the potential change terminal to the high level except when the sound emitter suffers from the short-circuit failure. When the sound emitter suffers from the short-circuit failure, the monitor voltage output circuit keeps a potential of the output terminal to a second low level regardless of the change of the potential of the potential change terminal to the high level during the sound emit period.

According to another aspect of the present disclosure, a vehicle approach warning apparatus is used for warning of an approach of a vehicle by causing a sound emitter mounted on the vehicle to emit a warning sound in response to a warning signal. The vehicle approach warning apparatus includes a warning sound generator, a monitor voltage output circuit, a sound emit determining section, and an open-circuit failure determining section. The warning sound generator generates the warning signal and outputs the warning signal to the sound emitter through first and second connection terminals connected to the sound emitter. The monitor voltage output circuit is connected to a potential change terminal having a potential changeable between a high level and a first low level. The monitor voltage output circuit outputs a monitor voltage from an output terminal by half-wave rectifying and integrating the warning signal. The sound emit determining section determines whether it is in the middle of a sound emit period where the warning signal is being outputted to the sound emitter or in the middle of a non-sound emit period where the warning signal is not being emitted to the sound emitter. The open-circuit failure determining section determines whether the sound emitter suffers from an open-circuit failure based on the monitor voltage. The monitor voltage output circuit includes a diode having a cathode connected to the output terminal. During the non-sound emit period, the monitor voltage output circuit keeps the potential of the output terminal to a second low level upon a change of the potential of the potential change terminal except when the sound emitter suffers from the open-circuit failure. When the sound emitter suffers from the open-circuit failure, the monitor voltage output circuit outputs the monitor voltage from the output terminal during the non-sound emit period in such a manner that the monitor voltage has a waveform specific to the open-circuit failure. The open-circuit failure determining section changes the potential of the potential change terminal between the high level and the first low level during the non-sound emit period.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

Figure 1:
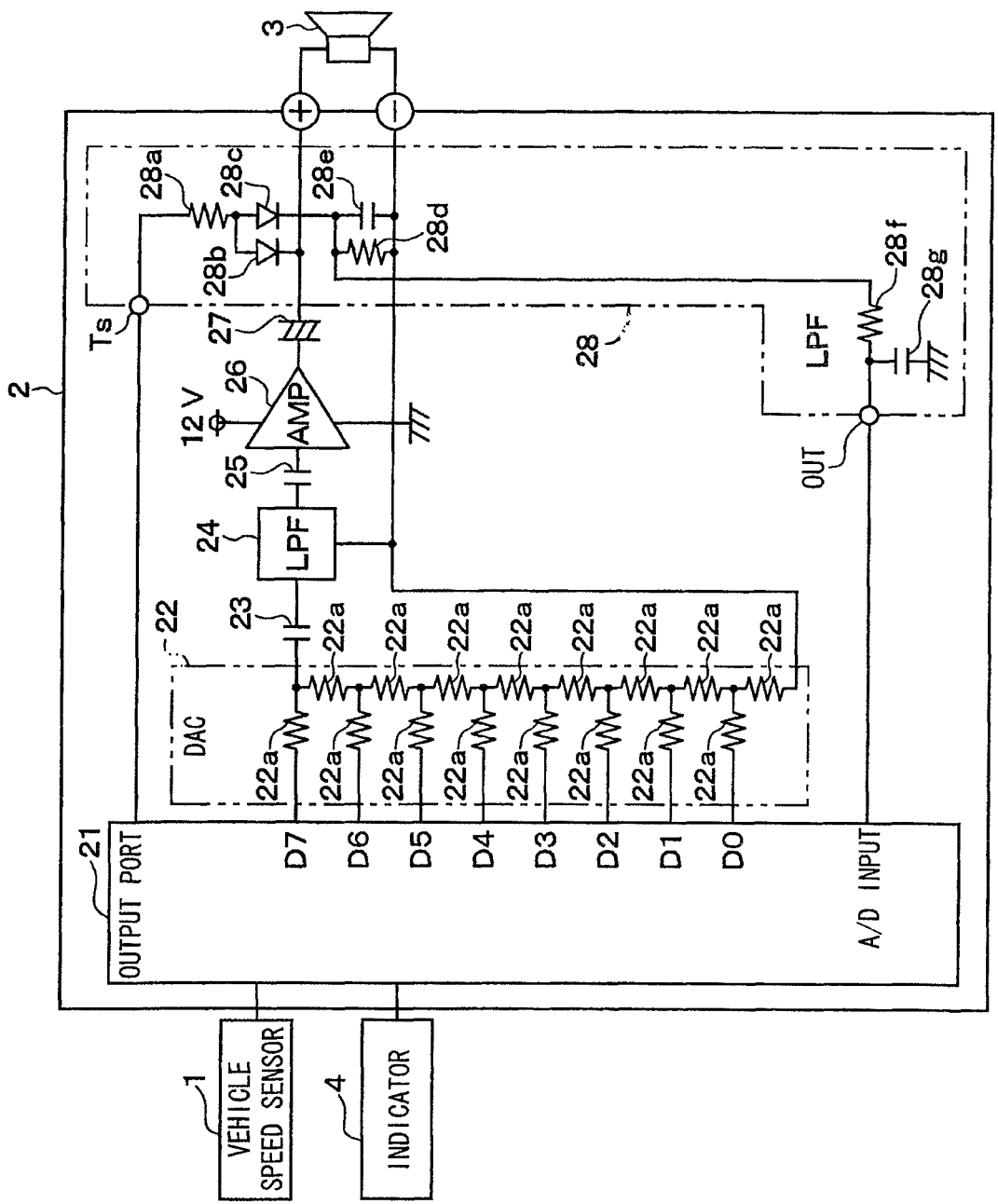
FIG. 1 is a diagram of a vehicle approach warning apparatus according to an embodiment of the present disclosure.

A vehicle approach warning apparatus 2 according to an embodiment of the present disclosure is described below with reference to FIG. 1. The vehicle approach warning apparatus 2 is mounted on a vehicle and connected to a vehicle speed sensor 1, a speaker 3, and an indicator 4 of the vehicle. The vehicle approach warning apparatus 2 warns others of an approach of the vehicle by causing the speaker 3 to emit a warning sound in response to a warning signal. Examples of the others can include pedestrians, bicyclists, and other vehicles.

The vehicle speed sensor 1 outputs a vehicle speed signal, indicative of a running speed of the vehicle, to the vehicle approach warning apparatus 2. The vehicle approach warning apparatus 2 detects the running speed of the vehicle based on the vehicle speed signal. The vehicle approach warning apparatus 2 outputs the warning signal to the speaker 3 after the vehicle starts to run as long as the running speed is not greater than 20 kilometers per hour (km/h).

The speaker 3 is installed, for example, in an engine room of the vehicle and connected to the vehicle approach warning apparatus 2 through a speaker output wire. The speaker 3 receives the warning signal from the vehicle approach warning apparatus 2 and outputs the warning sound in response to the warning signal.

The indicator 4 is installed, for example, in a meter panel of the vehicle and used to report a failure in the speaker 3. The indicator 4 has a short-circuit failure lamp for indicating that the speaker 3 suffers from a short-circuit failure (i.e., indicating that the speaker 3 is short-circuited). The indicator 4 further has an open-circuit failure lamp for indicating that the speaker 3 suffers from an open-circuit failure (i.e., indicating that the speaker 3 is open-circuited). The lamps of the indicator 4 illuminate according to a failure detection signal inputted from the vehicle approach warning apparatus 2.

The vehicle approach warning apparatus 2 includes a microcomputer 21, a D/A converter (DAC) 22, coupling capacitors 23, 25, and 27, a low-pass filter (LPF) 24, an amplifier (AMP) 26, and a monitor voltage output circuit 28.

The microcomputer 21 includes a RAM, a ROM, and an input/output (I/O) circuit. The microcomputer 21 executes processing in accordance with programs stored in the ROM. According to the embodiment, the microcomputer 21 further includes an A/D input port and an output port. The microcomputer 21 has an A/D conversion function to convert an analog signal, which is inputted from the A/D input port, to a digital signal by sampling the analog signal at a predetermined regular interval. The microcomputer 21 outputs a high signal or a low signal from the output port.

The DAC 22 converts a digital signal, which is inputted from the microcomputer 21, to an analog signal. The DAC 22 includes multiple ladder resistors 22a that are connected to form a R-2R ladder resistor network. A combined resistance of the R-2R ladder resistor network changes stepwise depending on voltage levels of data output terminals D0-D7 of the microcomputer 21, and a voltage depending on the combined resistance of the R-2R ladder resistor network is outputted from the DAC 22.

Each of the capacitors 23, 25, and 27 blocks a DC component of a signal and passes an AC component of the signal.

The LPF 24 blocks a high frequency component and passes a low frequency component of the signal which is outputted from the DAC 22 through the capacitor 23. According to the embodiment, the LPF 24 is constructed with a resistor and a capacitor.

The AMP 26 amplifies the signal, which is inputted from the DAC 22 through the capacitor 23, the LPF 24, and the capacitor 25, by a predetermined gain (i.e., amplification factor). The amplified signal is outputted from the AMP 26 to the speaker 3 through a first speaker terminal (+) and a second speaker terminal (−). The vehicle approach warning apparatus 2 and the speaker 3 are connected to each other through the first speaker terminal and the second speaker terminal.

The monitor voltage output circuit 28 outputs a monitor voltage by monitoring a voltage applied to the first speaker terminal and the second speaker terminal. When a warning signal having a predetermined frequency is outputted from the microcomputer 21 and the DAC 22, the warning signal is amplified by the AMP 26. The amplified warning signal is inputted to the speaker 3 through the first speaker terminal and the second speaker terminal so that the speaker 3 can emit the warning sound. The monitor voltage output circuit 28 half-wave rectifies and integrates a voltage applied to the first speaker terminal and the second speaker terminal. The monitor voltage output circuit 28 outputs a voltage corresponding to the integral to the A/D input terminal of the microcomputer 21.

The monitor voltage output circuit 28 is described in detail below. The monitor voltage output circuit 28 includes a charge current limiting resistor 28a, a first diode 28b, a second diode 28c, a discharging resistor 28d, a capacitor 28e, a resistor 28f, a capacitor 28g, a potential change terminal Ts, and an output terminal OUT.

A cathode of the first diode 28b is connected to the first speaker terminal. An anode of the first diode 28b is connected to the potential change terminal Ts through the limiting resistor 28a. The potential change terminal Ts is connected to the output port of the microcomputer 21. A potential of the potential change terminal Ts changes between a logic-high level and a low level in accordance with a potential of the output port of the microcomputer 21.

An anode of the second diode 28c is connected to a connection point between the limiting resistor 28a and the anode of the first diode 28b. A cathode of the second diode 28c is connected to the second speaker terminal through a parallel circuit of the discharging resistor 28d and the capacitor 28e.

Further, the cathode of the second diode 28c is connected to the output terminal OUT through a low-pass filter constructed with the resistor 28f and the capacitor 28g.

A forward voltage drop VF of the second diode 28c is equal to that of the first diode 28b. Since the anode of the first diode 28b and the anode of the second diode 28c are connected together, a potential of the cathode of the second diode 28c becomes almost equal to a potential of the cathode of the first diode 28b.

Further, since the first diode 28b is connected in reverse to the first speaker terminal, a voltage waveform of a half-wave rectified signal of the warning signal outputted from the AMP 26 appears as the potential of the cathode of the second diode 28c.

Further, since the anodes of the first diode 28b and the second diode 28c are connected together, the monitor voltage can be outputted even when the amplitude of the half-wave rectified signal is smaller than the forward voltage drop VF.

Further, the cathode of the second diode 28c is connected to the parallel circuit of the discharging resistor 28d and the capacitor 28e. When the potential of the warning signal outputted from the AMP 26 increases, the potential of the cathode of the second diode 28c increases. At this time, the capacitor 28e is charged through the limiting resistor 28a. When the potential of the warning signal is peaked and then starts to decrease, the capacitor 28e starts to be discharged. In this way, the capacitor 28e is repeatedly charged and discharged synchronously with the warning signal.

It is noted that a resistance of the discharging resistor 28d is set sufficiently greater than a resistance of the limiting resistor 28a. For example, according to the embodiment, the resistance of the discharging resistor 28d is about ten times greater than the resistance of the limiting resistor 28a.

Accordingly, the capacitor 28e is rapidly charged but slowly discharged. According to the embodiment, the monitor voltage output circuit 28 is configured so that the capacitor 28e can start to be charged before being completely discharged. The parallel circuit of the discharging resistor 28d and the capacitor 28e acts as a peak hold circuit.

In this way, a voltage of a signal generated by half-wave rectifying and integrating the warning signal charges the capacitor 28e and is outputted as the monitor voltage from the output terminal OUT through the low-pass filter constructed with the resistor 28f and the capacitor 28g.

Figure 2:
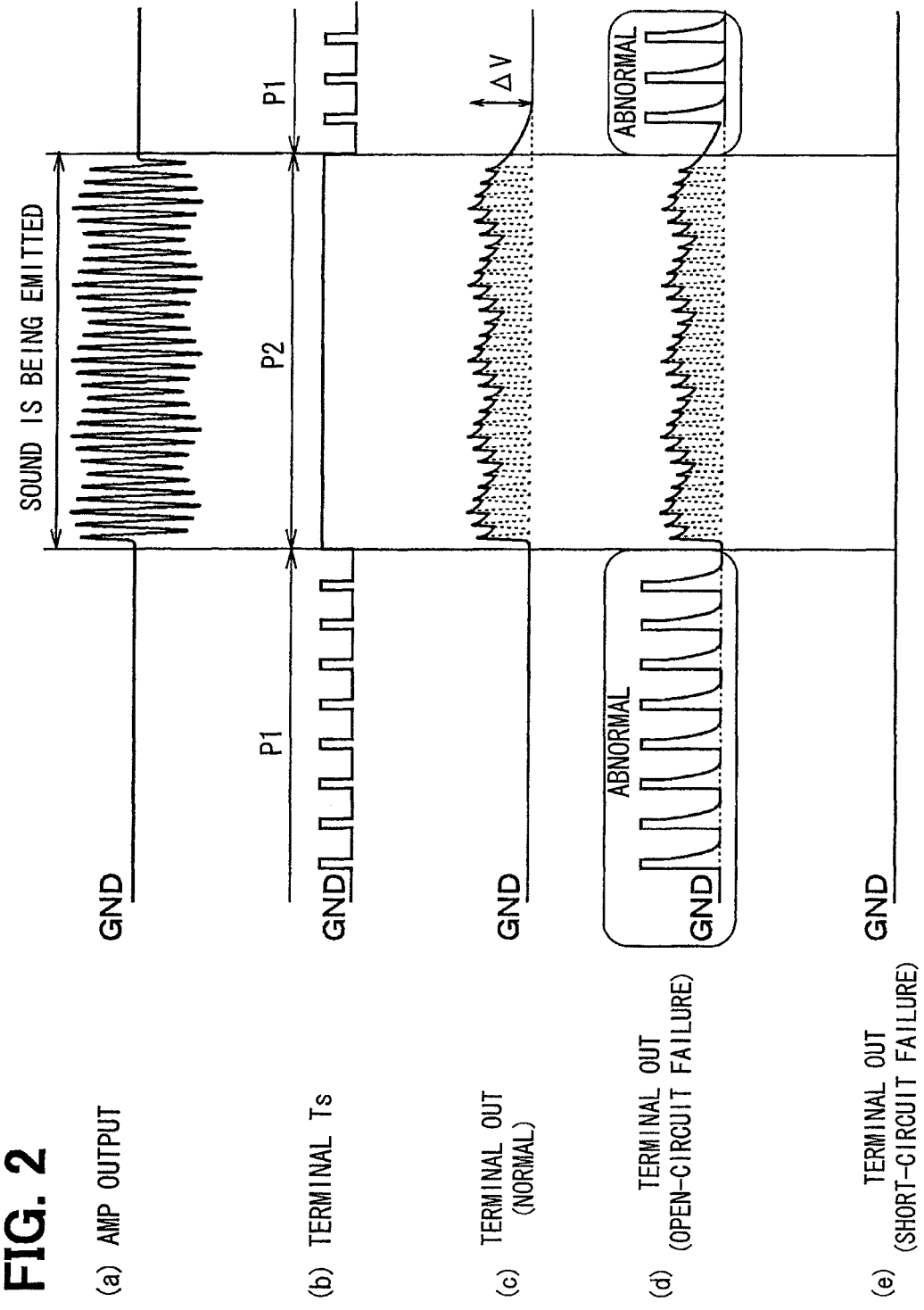
FIG. 2 is a diagram illustrating voltage waveforms appearing at portions in the vehicle approach warning apparatus.

FIG. 2 illustrates waveforms of voltages appearing at portions of the vehicle approach warning apparatus 2. In FIG. 2, (a) shows an output voltage of the AMP 26, (b) shows a voltage of the potential change terminal Ts, (c) shows a voltage of the output terminal OUT when the speaker 3 is normal (i.e., no failure occurs in the speaker 3), (d) shows a voltage of the output terminal OUT when the speaker 3 suffers from the open-circuit failure, and (e) shows a voltage of the output terminal OUT when the speaker 3 suffers from the short-circuit failure. As shown in (c) of FIG. 2, when the speaker 3 is normal, the voltage of the output terminal OUT has an amplitude of $\Delta V$.

Assuming that the speaker 3 is normal or suffers from the open-circuit failure, when the potential of the potential change terminal Ts changes to a high level during a sound emit period P2 where the warning signal is being outputted (i.e., warning sound is being emitted) as shown in (a) and (b) of FIG. 2, the voltage of the signal generated by half-wave rectifying and integrating the warning signal is outputted as the monitor voltage from the output terminal OUT as shown in (c) and (d) of FIG. 2. In contrast, if the speaker 3 suffers from the short-circuit failure, even when the potential of the potential change terminal Ts changes to the high level during the sound emit period P2, the potential of the output terminal OUT connected to the cathode of the second diode 28c remains at a low level as shown in (e) of FIG. 2. Thus, determination whether the short-circuit occurs in the speaker 3 can be performed during the sound emit period P2.

Next, assuming that the speaker 3 is normal or suffers from the short-circuit failure, when the potential of the potential change terminal Ts changes between a high level and a low level intermittently during a non-sound emit period P1 where the warning signal is not being outputted (i.e., warning sound is not being emitted) as shown in (a) and (b) of FIG. 2, the potential of the output terminal OUT connected to the cathode of the second diode 28c remains at a low level as shown in (c) and (e) of FIG. 2. In contrast, if the speaker 3 suffers from the open-circuit failure, when the potential of the potential change terminal Ts changes between a high level and a low level intermittently during the non-sound emit period P1, a voltage having an abnormal waveform changing synchronously with the potential of the potential change terminal Ts is outputted as the monitor voltage from the output terminal OUT as shown in (d) of FIG. 2. That is, if the speaker 3 suffers from the open-circuit failure, when the potential of the potential change terminal Ts changes during the non-sound emit period P1, the monitor voltage has a waveform specific to the open-circuit failure. Thus, determination whether the open-circuit occurs in the speaker 3 can be performed during the non-sound emit period P1.

The monitor voltage having a waveform specific to the open-circuit failure may be generated by fixing the potential change terminal Ts to a high level during the non-sound emit period P1. However, in this case, the speaker 3 may be excited and degraded in performance. To prevent such a disadvantage, according to the embodiment, as shown in (b) of FIG. 2, according to the embodiment, the potential of the potential change terminal Ts is repeatedly changed between a high level and a low level at a regular interval.

Figure 3:
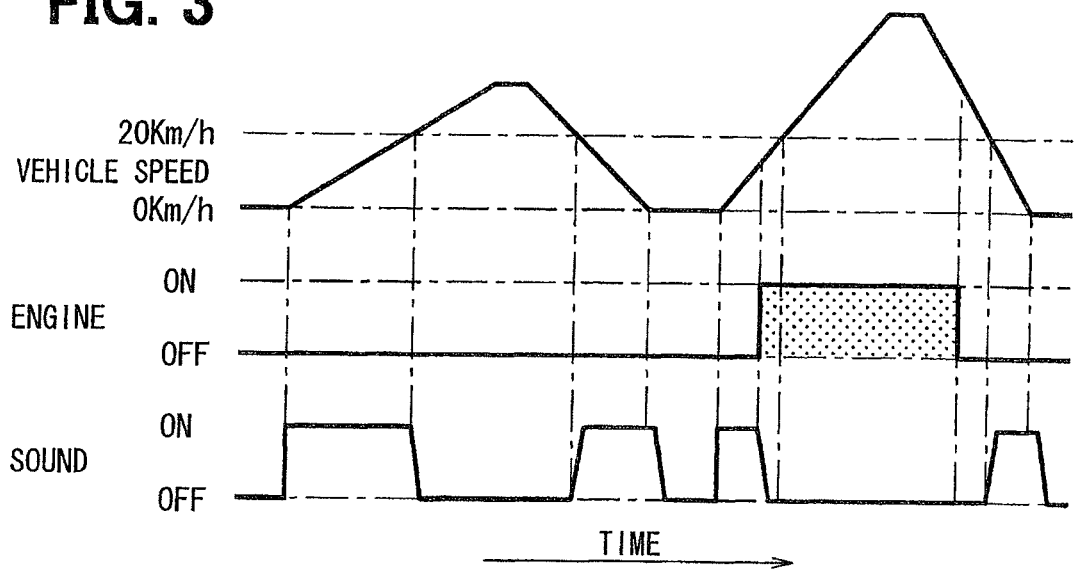
FIG. 3 is a diagram explaining a sound emit condition necessary to emit a warning sound.

For example, the vehicle approach warning apparatus 2 is mounted on a hybrid vehicle, which uses an engine and an electric motor to run. The vehicle approach warning apparatus 2 detects the running speed of the vehicle based on the vehicle speed signal. As shown in FIG. 3, the vehicle approach warning apparatus 2 outputs the warning signal to the speaker 3 so that the speaker 3 can emit the warning sound after the vehicle starts to run as long as the running speed is not greater than 20 km/h. When the running speed exceeds 20 km/h, the vehicle approach warning apparatus 2 stops outputting the warning signal, thereby causing the speaker 3 to stop emitting the warning sound. If the vehicle runs by using the engine, the vehicle approach warning apparatus 2 does not output the warning signal even when the running speed is not greater than 20 km/h. In this way, a sound emit condition necessary to emit the warning sound is based on the running speed of the vehicle and based on whether the engine is used.

When the sound emit condition is satisfied, the warning sound is emitted. According to the embodiment, the sound emit condition is satisfied when the vehicle runs with the electric motor only at a speed not greater than a 20 km/h.

Figure 4:
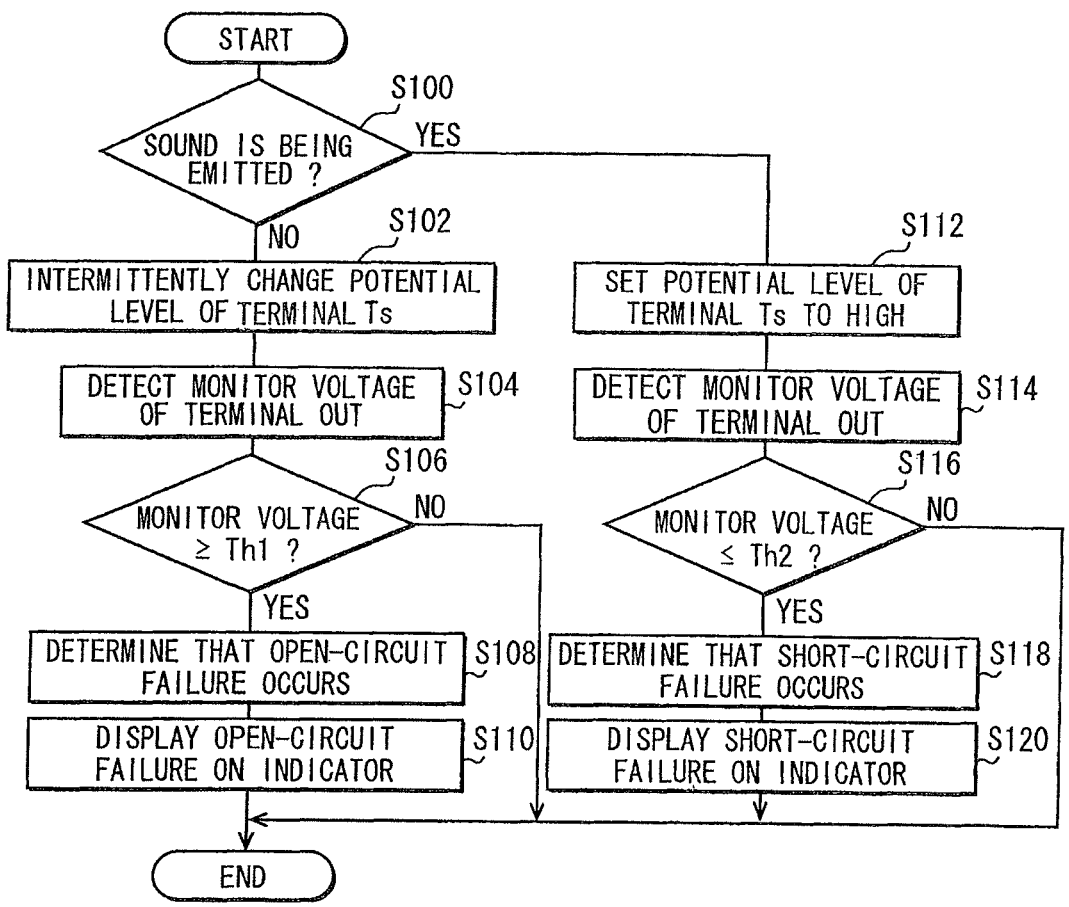
FIG. 4 is a flow chart of a failure detection process performed by a microcomputer of the vehicle approach warning apparatus.

Next, a failure detection process performed by the microcomputer 21 is described below with reference to FIG. 4. When an ignition switch of the vehicle is turned ON, the vehicle approach warning apparatus 2 is activated, and the microcomputer 21 repeatedly performs the failure detection process at a predetermined interval.

The failure detection process starts at S100, where the microcomputer 21 determines whether the warning sound is being emitted. Specifically, at S100, the microcomputer 21 determines whether the sound emit condition is satisfied.

For example, when the vehicle starts to run with the electric motor, the microcomputer 21 determines, at S100, that the sound emit condition is satisfied. If the sound emit condition is satisfied corresponding to YES at S100, the failure detection process proceeds to S112, where the microcomputer 21 outputs a high level signal from the output port, thereby setting the potential of the potential switch terminal Ts to a high level. After S112, the failure detection process proceeds to S114, where the microcomputer 21 detects the monitor voltage outputted from the output terminal OUT connected to the A/D input terminal. Specifically, at S114, the microcomputer 21 converts the monitor voltage to a digital signal and identifies the monitor voltage based on the digital signal.

After S114, the failure detection process proceeds to S116, where the microcomputer 21 determines whether the monitor voltage is not greater than a predetermined short-circuit failure threshold value Th2.

If the monitor voltage is not greater than the short-circuit failure threshold value Th2 corresponding to YES at S116, the failure detection process proceeds to S118, where the microcomputer 21 determines that the speaker 3 suffers from the short-circuit failure. After S118, the failure detection process proceeds to S120, where the microcomputer 21 reports occurrence of the short-circuit failure in the speaker 3 to a user (i.e., occupant of the vehicle) by activating the indicator 4. Specifically, at S120, the microcomputer 21 outputs a short-circuit failure detection signal to the indicator 4. In response to the short-circuit failure detection signal, the short-circuit failure lamp of the indicator 4 illuminates. After S120, the microcomputer 21 ends the failure detection process.

If the monitor voltage is greater than the short-circuit failure threshold value Th2 corresponding to NO at S116, the microcomputer 21 ends the failure detection process without activating the indicator 4.

In contrast, for example, when the running speed of the vehicle exceeds 20 km/h, the microcomputer 21 determines, at S100, that the sound emit condition is unsatisfied. If the sound emit condition is unsatisfied corresponding to NO at S100, the failure detection process proceeds to S102, where the microcomputer 21 intermittently outputs a high level signal from the output port, thereby intermittently changing the potential of the potential switch terminal Ts between a high level and a low level.

After S102, the failure detection process proceeds to S104, where the microcomputer 21 detects the monitor voltage outputted from the output terminal OUT connected to the A/D input terminal. Specifically, at S104, the microcomputer 21 converts the monitor voltage to a digital signal and identifies the monitor voltage based on the digital signal.

After S104, the failure detection process proceeds to S106, where the microcomputer 21 determines whether the monitor voltage is not less than a predetermined open-circuit failure threshold value Th1.

If the monitor voltage is not less than the open-circuit failure threshold value Th1 corresponding to YES at S106, the failure detection process proceeds to S108, where the microcomputer 21 determines that the speaker 3 suffers from the open-circuit failure. After S108, the failure detection process proceeds to S110, where the microcomputer 21 reports occurrence of the open-circuit failure in the speaker 3 by activating the indicator 4. Specifically, at S110, the microcomputer 21 outputs a open-circuit failure detection signal to the indicator 4. In response to the open-circuit failure detection signal, the open-circuit failure lamp of the indicator 4 illuminates. After S110, the microcomputer 21 ends the failure detection process.

The embodiment can be summarized as follows.

As described above, according to the embodiment, the vehicle approach warning apparatus 2 has the monitor voltage output circuit 28 connected to the potential change terminal Ts having a potential changeable between a high level and a low level. During the sound emit period P2 where the warning signal is being outputted to the speaker 3 through the first and second speaker terminals, the monitor voltage output circuit 28 outputs the monitor voltage from the output terminal OUT by half-wave rectifying and integrating the warning signal upon a change of the potential of the potential change terminal Ts to a high level except when the speaker 3 suffers from the short-circuit failure. When the sound emitter suffers from the short-circuit failure, the monitor voltage output circuit 28 keeps a potential of the output terminal OUT to a low level regardless of the change of the potential of the potential change terminal Ts to a high level during the sound emit period P2. The vehicle approach warning apparatus 2 further has the microcomputer 21 for determining whether it is in the middle of the sound emit period P2 or in the middle of the non-sound emit period P1. Upon determination that it is in the middle of the sound emit period P2, the microcomputer 21 sets (i.e., fixes) the potential of the potential change terminal Ts to a high level and detects the monitor voltage outputted from the output terminal OUT. Then, the microcomputer 21 determines whether the speaker 3 suffers from the short-circuit failure based on the detected monitor voltage. Thus, unlike a method, in which a voltage across a detection resistor inserted in the current path of the speaker 3 is monitored, there is no need to amplify the monitor voltage by a large gain. Accordingly, the influence of the external noise on the monitor voltage is reduced so that the accuracy of detecting the short-circuit failure in the speaker 3 can be increased.

During the non-sound emit period P1, the monitor voltage output circuit 28 keeps the potential of the output terminal OUT, which is connected to the cathode terminal of the second diode 28c, to a low level upon a change of the potential of the potential change terminal Ts except when the sound emitter suffers from the open-circuit failure. When the speaker 3 suffers from the open-circuit failure, the monitor voltage output circuit 28 outputs the monitor voltage from the output terminal in such a manner that the monitor voltage has a waveform specific to the open-circuit failure. Upon determination that it is in the middle of the non-sound emit period P1, the microcomputer 21 changes the potential of the potential change terminal Ts and detects the monitor voltage outputted from the output terminal OUT. Then, the microcomputer 21 determines whether the speaker 3 suffers from the open-circuit failure based on the detected monitor voltage. Thus, unlike the method, in which the voltage across the detection resistor inserted in the current path of the speaker 3 is monitored, there is no need to amplify the monitor voltage by a large gain. Accordingly, the influence of the external noise on the monitor voltage is reduced so that the accuracy of detecting the open-circuit failure in the speaker 3 can be increased.

In this way, the vehicle approach warning apparatus 2 can accurately detect both the short-circuit failure and the open-circuit failure in the speaker 3.

Further, according to the embodiment, the monitor voltage output circuit 28 can be constructed with the charge current limiting resistor 28a, the first diode 28b, the second diode 28c, the discharging resistor 28d, and the capacitor 28e. The cathode of the first diode 28b is connected to the first speaker terminal. The anode of the first diode 28b is connected to the potential change terminal Ts through the limiting resistor 28a. The anode of the second diode 28c is connected to the connection point between the limiting resistor 28a and the anode of the first diode 28b. The cathode of the second diode 28c is connected to the second speaker terminal through the parallel circuit of the discharging resistor 28d and the capacitor 28e.

Further, according to the embodiment, during the non-sound emit period P1, the monitor voltage is detected by changing the potential of the potential change terminal Ts at a regular time interval. Thus, the determination whether the speaker 3 suffers from the open-circuit can be performed at a regular time interval.

Further, according to the embodiment, when the short-circuit failure in the speaker 3 is detected, the occurrence of the short-circuit failure can be reported to the user. Thus, the user can be aware of the short-circuit failure in the speaker 3 and prompted to stop driving the vehicle.

Further, according to the embodiment, when the open-circuit failure in the speaker 3 is detected, the occurrence of the open-circuit failure can be reported to the user. Thus, the user can be aware of the open-circuit failure and prompted to stop driving the vehicle.

(Modifications)

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

The vehicle on which the vehicle approach warning apparatus 2 is mounted is not limited to a hybrid vehicle. For example, the vehicle approach warning apparatus 2 can be mounted on an electric vehicle.

In the embodiment, the speaker 3 is used as a sound emitter for emitting the warning sound. The speaker 3 can be replaced with another type of sound emitter such as a buzzer.

In the embodiment, a warning signal generator for generating the warning signal is constructed with the microcomputer 21, the DAC 22, and the AMP 26. The warning signal generator is not limited to that disclosed in the embodiment.

In the embodiment, when a failure occurs in the speaker 3, the indicator 4 indicates the occurrence and type of the failure, thereby reporting the failure to a user. The failure can be reported to the user in a different way. For example, when the failure occurs in the speaker 3, failure information indicative of the occurrence and type of the failure can be stored in a memory device such as an EEPROM. In such an approach, the failure information can be used for failure diagnosis in an automobile repair shop or the like.

Correspondence between terms used in the embodiment and claims are as follows. The microcomputer 21 can serve as a sound emit determining section by performing step S100.

The microcomputer 21 can also serve as a short-circuit failure determining section by performing step S116 or S118. The microcomputer 21 can also serve as an open-circuit failure determining section by performing step S106 or S108. The microcomputer 21 can also serve as a short-circuit failure reporting section by performing step S120. The microcomputer 21 can also serve as an open-circuit failure reporting section by performing step S110.

What is claimed is:

1. A vehicle approach warning apparatus for warning of an approach of a vehicle by causing a sound emitter mounted on the vehicle to emit a warning sound in response to a warning signal, the vehicle approach warning apparatus comprising:
   first and second connection terminals configured to be connected the sound emitter;
   a warning sound generator configured to generate the warning signal and output the warning signal to the sound emitter through the first and second connection terminals;
   a monitor voltage output circuit connected to a potential change terminal having a potential changeable between a high level and a first low level, the monitor voltage output circuit configured to output a monitor voltage from an output terminal;
   a sound emit determining section configured to determine whether it is in the middle of a sound emit period where the warning signal is being outputted to the sound emitter or in the middle of a non-sound emit period where the warning signal is not being emitted to the sound emitter; and
   a short-circuit failure determining section configured to determine whether the sound emitter suffers from a short-circuit failure based on the monitor voltage, the short-circuit failure determining section configured to change the potential of the potential change terminal to the high level during the sound emit period, wherein
   during the sound emit period, the monitor voltage output circuit outputs the monitor voltage from the output terminal by half-wave rectifying and integrating the warning signal upon a change of the potential of the potential change terminal to the high level except when the sound emitter suffers from the short-circuit failure, and
   when the sound emitter suffers from the short-circuit failure, the monitor voltage output circuit keeps a potential of the output terminal to a second low level during the sound emit period.

2. The vehicle approach warning apparatus according to claim 1, further comprising:
   an open-circuit failure determining section configured to determine whether the sound emitter suffers from an open-circuit failure based on the monitor voltage, wherein
   the monitor voltage output circuit includes a diode having a cathode connected to the output terminal,
   during the non-sound emit period, the monitor voltage output circuit keeps the potential of the output terminal to the second low level upon a change of the potential of the potential change terminal except when the sound emitter suffers from the open-circuit failure,
   when the sound emitter suffers from the open-circuit failure, the monitor voltage output circuit outputs the monitor voltage from the output terminal during the non-sound emit period in such a manner that the monitor voltage has a waveform specific to the open-circuit failure, and the open-circuit failure determining section changes the potential of the potential change terminal between the high level and the first low level during the non-sound emit period.

3. The vehicle approach warning apparatus according to claim 1, wherein
the monitor voltage output circuit includes a first diode, a second diode, a first resistor, and a parallel circuit of a second resistor and a capacitor,
an anode of the first diode is connected to the potential change terminal through the first resistor,
a cathode of the first diode is connected to the first connection terminal,
an anode of the second diode is connected to a connection point between the first resistor and the anode of the first diode, and
a cathode of the second diode is connected to the second connection terminal through the parallel circuit.

4. The vehicle approach warning apparatus according to claim 2, wherein
the open-circuit failure determining section changes the potential of the potential change terminal during the non-sound emit period at a regular time interval.

5. The vehicle approach warning apparatus according to claim 1, further comprising:
a short-circuit failure reporting section configured to report a failure in the sound emitter to a user when the short-circuit failure determining section determines that the sound emitter suffers from the short-circuit failure.

6. The vehicle approach warning apparatus according to claim 2, further comprising:
an open-circuit failure reporting section configured to report a failure in the sound emitter to a user when the open-circuit failure determining section determines that the sound emitter suffers from the open-circuit failure.

7. A vehicle approach warning apparatus for warning of an approach of a vehicle by causing a sound emitter mounted on the vehicle to emit a warning sound in response to a warning signal, the vehicle approach warning apparatus comprising:
first and second connection terminals configured to be connected to the sound emitter;
a warning sound generator configured to generate the warning signal and output the warning signal to the sound emitter through the first and second connection terminals;
a monitor voltage output circuit connected to a potential change terminal having a potential changeable between a high level and a first low level, the monitor voltage output circuit configured to output a monitor voltage from an output terminal by half-wave rectifying and integrating the warning signal;
a sound emit determining section configured to determine whether it is in the middle of a sound emit period where the warning signal is being outputted to the sound emitter or in the middle of a non-sound emit period where the warning signal is not being outputted to the sound emitter; and
an open-circuit failure determining section configured to determine whether the sound emitter suffers from an open-circuit failure based on the monitor voltage, wherein
the monitor voltage output circuit includes a diode having a cathode connected to the output terminal,
the monitor voltage output circuit keeps the potential of the output terminal to a second low level upon a change of the potential of the potential change terminal during the non-sound emit period except when the sound emitter suffers from the open-circuit failure,
when the sound emitter suffers from the open-circuit failure, the monitor voltage output circuit outputs the monitor voltage from the output terminal during the non-sound emit period in such a manner that the monitor voltage has a waveform specific to the open-circuit failure, and
the open-circuit failure determining section changes the potential of the potential change terminal between the high level and the first low level during the non-sound emit period.

8. The vehicle approach warning apparatus according to claim 7, wherein
the monitor voltage output circuit further includes an other diode, a first resistor, and a parallel circuit of a second resistor and a capacitor,
an anode of the other diode is connected to the potential change terminal through the first resistor,
a cathode of the other diode is connected to the first connection terminal,
an anode of the diode is connected to a connection point between the first resistor and the anode of the other diode, and
a cathode of the diode is connected to the second connection terminal through the parallel circuit.

9. The vehicle approach warning apparatus according to claim 7, wherein
the open-circuit failure determining section changes the potential of the potential change terminal during the non-sound emit period at a regular time interval.

10. The vehicle approach warning apparatus according to claim 7, further comprising:
an open-circuit failure reporting section configured to report a failure in the sound emitter to a user when the open-circuit failure determining section determines that the sound emitter suffers from the open-circuit failure.

* * * * *